US009223042B2

(12) United States Patent
Maucec et al.

(10) Patent No.: US 9,223,042 B2
(45) Date of Patent: Dec. 29, 2015

(54) SYSTEMS AND METHODS FOR THE QUANTITATIVE ESTIMATE OF PRODUCTION-FORECAST UNCERTAINTY

(75) Inventors: Marko Maucec, Englewood, CO (US); Alvin Stanley Cullick, Thornton, CO (US)

(73) Assignee: Landmark Graphics Corporation, Houston, TX (US)

( * ) Notice: Subject to any disclaimer, the term of this patent is extended or adjusted under 35 U.S.C. 154(b) by 706 days.

(21) Appl. No.: 13/498,293

(22) PCT Filed: Sep. 25, 2009

(86) PCT No.: PCT/US2009/058504
§ 371 (c)(1),
(2), (4) Date: May 31, 2012

(87) PCT Pub. No.: WO2011/037580
PCT Pub. Date: Mar. 31, 2011

(65) Prior Publication Data
US 2012/0232865 A1 Sep. 13, 2012

(51) Int. Cl.
*G06G 7/58* (2006.01)
*G01V 1/30* (2006.01)
*G06G 7/60* (2006.01)
*G06G 7/48* (2006.01)

(52) U.S. Cl.
CPC .. *G01V 1/30* (2013.01); *G06G 7/48* (2013.01); *G06G 7/60* (2013.01)

(58) Field of Classification Search
CPC ............... G06G 7/48; G06F 7/60; G01V 1/30
USPC .............................................. 703/10
See application file for complete search history.

(56) References Cited

U.S. PATENT DOCUMENTS

| | | | |
|---|---|---|---|
| 6,160,919 A | 12/2000 | Hale | |
| 6,826,486 B1* | 11/2004 | Malinverno | 702/16 |
| 8,095,345 B2* | 1/2012 | Hoversten | 703/2 |
| 2004/0265784 A1 | 12/2004 | Stout et al. | |
| 2007/0055447 A1 | 3/2007 | Mickaele et al. | |
| 2008/0082469 A1 | 4/2008 | Wilkinson et al. | |
| 2008/0162100 A1* | 7/2008 | Landa | 703/10 |
| 2008/0319726 A1* | 12/2008 | Berge et al. | 703/10 |

FOREIGN PATENT DOCUMENTS

EP 0980564 B1 3/2007

OTHER PUBLICATIONS

International Preliminary Examining Authority, International Preliminary Report on Patentability, PCT/US09/58504, Jan. 6, 2012, 17 pages.
Kurt Tobler, Patent Examination Report 1.; Patent Application No. 2009353036; Apr. 3, 2014; 3 pages, Australian Government IP Australia; Sydney Australia.

(Continued)

*Primary Examiner* — Dwin M Craig
(74) *Attorney, Agent, or Firm* — Crain, Caton & James; John Wustenberg

(57) ABSTRACT

Systems and methods for updating posterior geological models by integrating various reservoir data to support dynamic-quantitative data-inversion, stochastic-uncertainty-management and smart reservoir-management.

20 Claims, 6 Drawing Sheets

(56) References Cited

OTHER PUBLICATIONS

International Preliminary Report on Patentability; PCT/US09/58504; Jan. 6, 2012; International Preliminary Examining Authority/US, Alexandria, Virginia; 17 pages.

International Search Report and the Written Opinion of the International Searching Authority; PCT/US09/58504; Nov. 13, 2009; International Searching Authority/US, Alexandria, Virginia; 7 pages.

Article 34 Amendment and Response; PCT/US09/58504; Systems and Methods for the Quantitative Estimate of Production-Forecast Uncertainty; Apr. 25, 2011; 11 pages.

M. Maucec, S. Douma, D. Hohl, J. Leguijt, E. Jimenez, and A. Datta-Gupta; Streamline-Based History Matching and Uncertainty: Markov-chain Monte Carlo Study of an Offshore Turbidite Oil Field; SPE 109943; 2007 SPE Annual Technical Conference and Exhibition, Anaheim, California, USA; Nov. 2007; pp. 1-16.

Jafarpour, Behnam and McLaughlin, Dennis B.; History matching with an ensemble Kalman filter and discrete cosine parameterization; Springer Science + Business Media B.V. 2008; Jan. 7, 2008; 18 pages.

C. Yang, L. Nghiem, C. Card, and M. Bremier; Reservoir Model Uncertainty Quantification Through Computer-Assisted History Matching, SPE 109825; Spe Annual Technical Conference and Exhibition, Anaheim, California, USA; Nov. 11-14, 2007; pp. 1-12.

J-P. Norgard; Revolutionizing History Matching and Uncertainty Assessment; GEO ExPro, Sep. 2006; pp. 34-35.

B.R. Al-Shamma, and R. Teigland; History matching of the Valhall using a globalooptimization method and uncertainty assessment; SPE 100946; SPE Annual Technical Conference and Exhibition, San Antonio, Texas, USA; Sep. 24-27, 2006; pp. 1-11.

E. Arroyo-Negrette, D. Devegowda, A. Datta-Gupta, and J. Choe; Streamline-assisted ensemble Kalman filter for rapid and continuous reservoir model updating; SPE 104255; 2006 International Oil & Gas Conference and Exhibition, Beijing, China; Dec. 5-7, 2006; pp. 1046-1060.

Y. Gu, and D.S. Oliver; An iterative ensemble Kalman filter for multiphase fluid flow data assimilation; SPE 108438; SPE Journal; Dec. 2007; pp. 438-446.

Y. Zhang and D.S. Oliver; History matching using a hierarchical stochastic model with ensemble Kalman filter: A field case study; SPE 118879; 2009 SPE Reservoir Simulation Symposium, Houston, Texas, USA; Feb. 2-4, 2009; pp. 1-15.

C.C. Agbalaka and D.S. Oliver; Automatic history matching of production and facies data with non-stationary proportions using EnKF; SPE 118916; 2009 SPE Reservoir Simulation Symposium, the Woodlands, Texas, USA; Feb. 2-4, 2009; pp. 1-14.

Y. Chen and D.S. Oliver; Ensemble-based closed-loop optimization applied to Brugge field; SPE 118926; 2009 SPE Reservoir Simulation Symposium, the Woodlands, Texas, USA; Feb. 2-4, 2009; pp. 1-22.

Y. Chen and D.S. Oliver; Efficient ensemble-based closed-loop production optimization; SPE 112873; 2008 SPE/DOE Improved Oil Recovery Symposium, Tulsa, OK, USA; Apr. 19-23, 2008; pp. 1-18.

Oliver, D., Cunha, L. and Reynolds, A. (1997), Markov chain Monte Carlo methods for conditioning a permeability field to pressure data; International Association for Mathematical Geology, Mathematical Geology, vol. 29, No. 1; pp. 61-91.

A. Mallah, H. Perez, A. Datta-Gupta, and W. Alamoudi; Multiscale data integration with Markov Random Fields and Markov Chain Monte Carlo: a field application in the Middle East; paper SPE 81544; SPE 13th Middle East Oil Show and Conference, Bahrain; Jun. 9-12, 2003; pp. 1-18.

A. Mondal, Y. Efendiev, B. Mallick, and A. Datta-Gupta, Bayesian uncertainty quantification for flows in heterogeneous porous media using reversible jump Markov chain Monte Carlo methods (submitted); NSF CMG, King Abdullah University of Science and Technology (KAUST); Apr. 16, 2009; pp. 1-36.

Oliver, D.S., He, N. and Reynolds, A.C. (1996), Conditioning permeability fields to pressure data, presented at the 1996 5th European conference on the mathematics of oil recovery (ECMOR), Leoben, Austria, Sep. 3-6, 1996; pp. 259-269.

Efendiev, Y., Datta-Gupta, A., Ginting, V., Ma, X. And Mallick, B. (2005); An Efficient Two-Stage Markov Chain Monte Carlo Method for Dynamic Data Integration; Water Resources Research, vol. 41, W12423; Dec. 20, 2005; pp. 1-6.

A. Datta-Gupta, and M.J. King; Streamline Simulation: Theory and Practice, Society of Petroleum Engineers; Textbook Series, 2007; 4 pages.

Cheng, H., Khargoria, A., He, Z., and Datta-Gupta, A. (2004), Fast History Matching of Finite-Difference Models Using Streamline-Derived Sensitivities, paper SPE 89447, SPE/DOE 14th symposium on Improved Oil Recovery, Tulsa, OK, Apr. 17-21, 2004; pp. 1-14.

Hohl, D., E. Jimenez and A. Datta-Gupta, Field Experiences With History Matching an Offshore Turbiditic Reservoir Using Inverse Modeling, paper SPE 101983, SPE Annual Technical Conference and Exhibition, San Antonio, TX, Sep. 24-26, 2006; pp. 2-9.

EnABLE TM , www.roxar.com/enable, 2012, 1 page.

M. Maucec; From History Matching to Quantitative Forecast Uncertainty: Enhancing the role of data integration and model parametrization in dynamic model inversion; R&D proposal; Halliburton/Landmark, Aug. 2008; pp. 1-23.

C.F.M. Bos, Production forecasting with uncertainty quantification: PUNQ-2, TNO report, NITG 99-255-A, 1999, 4 pages.

M. Rotondi, G. Nicotra, A. Godi, F.M. Contento, M.J. Blunt, and M.A. Christie, Hydrocarbon production forecast and uncertainty quantification: a field application, paper SPE 102135, SPE Annual Technical Conference and Exhibition, San Antonio, TX, Sep. 24-27, 2006; pp. 1-9.

X. Ma, A. Datta-Gupta, Y. Efendiev, A multistage MCMC method with non-parametric error model for efficient uncertainty quantification in history matching, paper SPE 115911, SPE Annual Technical Conference and Exhibition, Denver, CO, Sep. 21-24, 2008; pp. 1-19.

E. Jimenez, Fast History Matching of Time-Lapse Seismic and Production Data for High Resolution Models, Dissertation, Texas A&M University, May 2008, 152 pages.

J. Caers, Distance-based stochastic modeling: theory and applications, Energy Resources Engineering Department, Stanford University, Standford, CA, USA; (powerpoint) pp. 1-8.

B. Jafarpour, D.B. McLaughlin, Reservoir Characterization with the Discrete Cosine Transform, SPE 106453, SPE RSS, Houston, TX, Feb. 26-28, 2007; pp. 182-201.

C. Scheidt, and J. Caers, A workflow for Spatial Uncertainty Quantification using distances and kernels, SCRF report 20, Stanford University, Stanford, CA, USA, pp. 1-34.

Pan Cong, Notification of First Office Action, CN Application No. 200980161639.5, Jun. 13, 2014, 5 pages, The Intellectual Property Office of China, Bejing China.

Pan Cong; Notice of Second Office Action, CN Application No. 200980161639.5; Jan. 23, 2015; 8 pages; The State Intellectual Property Office of the People's Republic of China; Beijing China.

Lars Koch; Response to Examination Report; Australian Application No. 2009353036; Apr. 2, 2015; 6 pages; Pizzy's Patent and Trademark Attorneys; Australia.

Peter S.L. Wong, Amendment and Response After Examiner's Letter—Response to Requisition under Section 30(2) of the Patent Rules, Canadian Patent Application No. 2774156, Oct. 15, 2015, 14 pages, Parlee McLaws LLP, Edmonton, Alberta, Canada.

* cited by examiner

SYSTEMS AND METHODS FOR THE QUANTITATIVE ESTIMATE OF PRODUCTION-FORECAST UNCERTAINTY

CROSS-REFERENCE TO RELATED APPLICATIONS

The priority of PCT Patent Application No. PCT/US09/58504, filed on Sep. 25, 2009, is hereby claimed, and the specification thereof is incorporated herein by reference.

STATEMENT REGARDING FEDERALLY SPONSORED RESEARCH

Not applicable.

FIELD OF THE INVENTION

The present invention generally relates to estimating oil and gas recovery for various reservoir production scenarios. More particularly, the present invention relates to new reservoir-data integration and inversion techniques for the quantitative estimation of hydrocarbon-reservoir production-forecast uncertainty.

BACKGROUND OF THE INVENTION

In large-scale oil and gas exploration and production, statistical distributions of the recovery performance for various development scenarios form the quantitative foundation of the investment decision process. Accurate reservoir forecasting depends largely on the accurate estimation of dynamic performance statistics and evaluating the recovery performance through reservoir simulations. Evaluating the recovery performance through reservoir simulations is an integral component of dynamic data integration and inversion, which is commonly referred to as "History Matching" and, ultimately, reservoir production forecasting.

History Matching

History matching represents the act of adjusting a reservoir model until it closely reproduces the observed data from the field. The historical production and pressures are matched as closely as possible. The accuracy of the history matching depends on the quality of the reservoir model and the quality and quantity of pressure and production data. After a model has been history matched, it can be used to simulate future reservoir behavior with a higher degree of confidence, particularly if the adjustments are constrained by known geological properties in the reservoir.

Traditionally, history matching has been performed manually and methods from the 1980's are still widely used. This is a time-consuming process and prone to personal bias. One-parameter-at-a-time type sensitivity studies, for example, typically lack quantitative rigor, are less susceptible to review and are usually bound to generate a single-match reservoir model. In geologically-complex reservoirs, quantification of the effect of stratigraphic and structural uncertainties on the dynamic performance statistics is imperative to reservoir simulation. To fully account for such uncertainties, diverse geological realizations that cover a sufficiently large range are selected to approximate the forecast statistics, which is becoming of fundamental relevance for Quantitative Reservoir Management (QRM).

Recent advances in computing have created a new technical discipline commonly referred to as computer-assisted history matching, which can be divided into three main methods: deterministic, stochastic and hybrid. History matching is an inverse problem, highly non-linear and ill-posed. The solution to such a problem inevitably resorts to recursive algorithms that, depending on the prior information, can reveal a whole suite of models (i.e. realizations) to fit the dynamic data.

During the last decade, stochastic methods have become widely recognized throughout the oil and gas industry, with the main developments in the areas of i) evolutionary algorithms (e.g. genetic algorithms or evolution strategy); ii) data assimilation with ensemble Kalman filters; and iii) Bayesian-based sequential Monte Carlo or Markov chain Monte Carlo (MCMC) methods. In Bayesian sampling, the objective function is constructed using the Bayesian formulation:

$$p_{m|d}(m \mid d) = \frac{p_{d|m}(d \mid m) p_m(m)}{p_d(d)}$$

which combines observed data with the prior geological information, where $p_{m|d}(m|d)$, $P_{d|m}(d|m)$ and $p_m(m)$ represent the posterior, likelihood, and prior probability distribution, respectively. The normalization factor $p_d(d)$ represents the probability associated with the data, which is independent of the model parameters and is usually treated as a constant.

The Bayesian-based sequential Monte Carlo or Monte Carlo Markov chain Monte Carlo methods provide the most statistically rigorous and accurate way for sampling a posterior probability density function (pdf), but when deployed in direct (i.e. analog) simulation, suffer from prohibitively high computational costs because of high rejection rates and the necessity to run a full flow simulation for every proposed model realization. This problem has been addressed by proposing a two-stage method with a high acceptance probability of the Metropolis-Hastings algorithm. The method works well for linear problems, but not for nonlinear computer-assisted history-matching applications. To improve on that, a rigorous two-stage MCMC approach has been proposed to increase the acceptance rate and reduce the computational effort by using the sensitivities (i.e. derivatives of generalized travel time with respect to given reservoir property) calculated with the use of streamline tracing technology.

Quantification and Reservoir Production Uncertainty Forecasting

Uncertainty represents an inherent component in dynamic reservoir modeling, primarily because of data noise, the systematic modeling error, and non-uniqueness of the inverse problem solution. In general, static data (e.g. well logs, cores, and seismic traces) and dynamic data (e.g. production history, pressure transient tests, etc.) are analyzed. Recent advances in static modeling technology enable rapid construction of a large number of geologic realizations, but the computational cost associated with full-physics reservoir simulation is still prohibitive. Integration of the data from different sources is a non-trivial assignment, because deployed data span a variety in length, scales of heterogeneity and usually have a different degree of precision. Data integration, as implemented in history matching, is a part of the data assimilation process, which refers to the estimation of parameters and dynamic variables of a model on the basis of measurement data. The model refers to the "model of the oil reservoir" and is formulated in terms of the production based performance criteria.

Reducing uncertainty can be achieved by integrating additional data in subsurface modeling and is seen as one of the crucial components of Smart Reservoir Management. State-of-the-art industrial applications for uncertainty management and production forecast combine experimental design, maximum entropy estimators, ensemble Kalman filters or neighborhood algorithms. Neighborhood algorithms are well-known algorithms for solving non-linear geophysical inversion problems and usually include two stages: i) a search stage—a method for searching in a multi-dimensional parameter space where the objective is to find models within acceptable values of user-supplied objective function and ii) an appraisal stage—where the entire ensemble of models produced in the search stage is used to derive some form of Bayesian measures (e.g. covariance or marginal PDFs).

There is therefore, a need for integrating various reservoir data to support dynamic-quantitative data-inversion, stochastic-uncertainty-management and smart reservoir-management.

SUMMARY OF THE INVENTION

The present invention meets the above needs and overcomes one or more deficiencies in the prior art by providing systems and methods for updating posterior geological models by integrating various reservoir data to support dynamic-quantitative data-inversion, stochastic-uncertainty-management and smart reservoir-management.

In one embodiment, the present invention includes a method for updating posterior geological models, which comprises: a) computing new geological realizations for a prior geological model using a computer processor; b) computing an exact likelihood of an objective function using the new geological realizations for the prior geological model or an acceptable number of the new geological realizations for the prior geological model; c) defining an initial state for a sequential Monte Carlo chain based on the exact likelihood of an objective function; d) defining a new sample based on the initial state for a sequential Monte Carlo chain and a random sample from the prior geological model; e) computing an approximate likelihood of an objective function using the new sample; f) repeating step d), based only on another random sample from the prior geological model, and step e) until the approximate likelihood of an objective function meets an acceptance criteria; g) computing another exact likelihood of an objective function using the new sample if the new sample meets the acceptance criteria; h) repeating step d), based only on another random sample from the prior geological model, and steps e) through g) until the another exact likelihood of an objective function meets another acceptance criteria; i) repeating step d), based only on another random sample from the prior geological model, and steps e) through h) until a convergence criteria is met; and j) storing each new sample that meets the acceptance criteria and the another acceptance criteria, each new sample representing a respective updated posterior geological model.

In another embodiment, the present invention includes a non-transitory program carrier device tangibly carrying computer executable instructions for updating posterior geological models. The instructions are executable to implement a) computing new geological realizations for a prior geological model; b) computing an exact likelihood of an objective function using the new geological realizations for the prior geological model or an acceptable number of the new geological realizations for the prior geological model; c) defining an initial state for a sequential Monte Carlo chain based on the exact likelihood of an objective function; d) defining a new sample based on the initial state for a sequential Monte Carlo chain and a random sample from the prior geological model; e) computing an approximate likelihood of an objective function using the new sample; f) repeating step d), based only on another random sample from the prior geological model, and step e) until the approximate likelihood of an objective function meets an acceptance criteria; g) computing another exact likelihood of an objective function using the new sample if the new sample meets the acceptance criteria; h) repeating step d), based only on another random sample from the prior geological model, and steps e) through g) until the another exact likelihood of an objective function does not meet another acceptance criteria; i) repeating step d), based only on another random sample from the prior geological model, and steps e) through h) until a convergence criteria is met; and j) storing each new sample that meets the acceptance criteria and the another acceptance criteria, each new sample representing a respective updated posterior geological model.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

Method Description

The following methods propose an integral closed-loop approach in dynamic quantification of uncertainty, based on streamline simulations, as techniques for pre-screening geological models. The methods combine a fast data inversion algorithm with efficient model parametrization and ranking techniques for rapid decision-making in the course of reservoir management.

Figure 1:
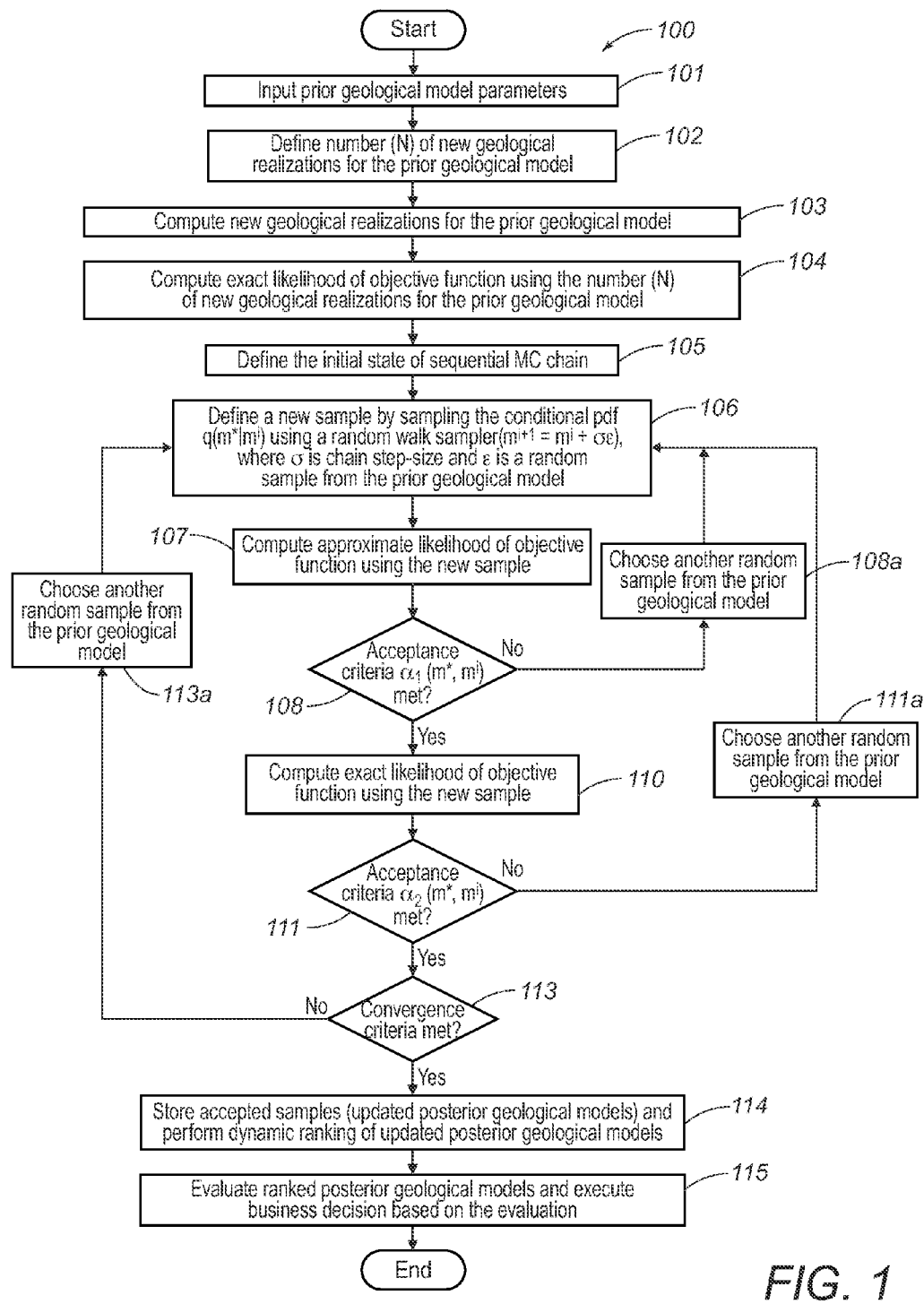
FIG. 1 is a flow diagram illustrating one embodiment of a method for implementing the present invention.

Referring now to FIG. 1, a flow diagram illustrates one embodiment of a method 100 for implementing the present invention.

Figure 7:
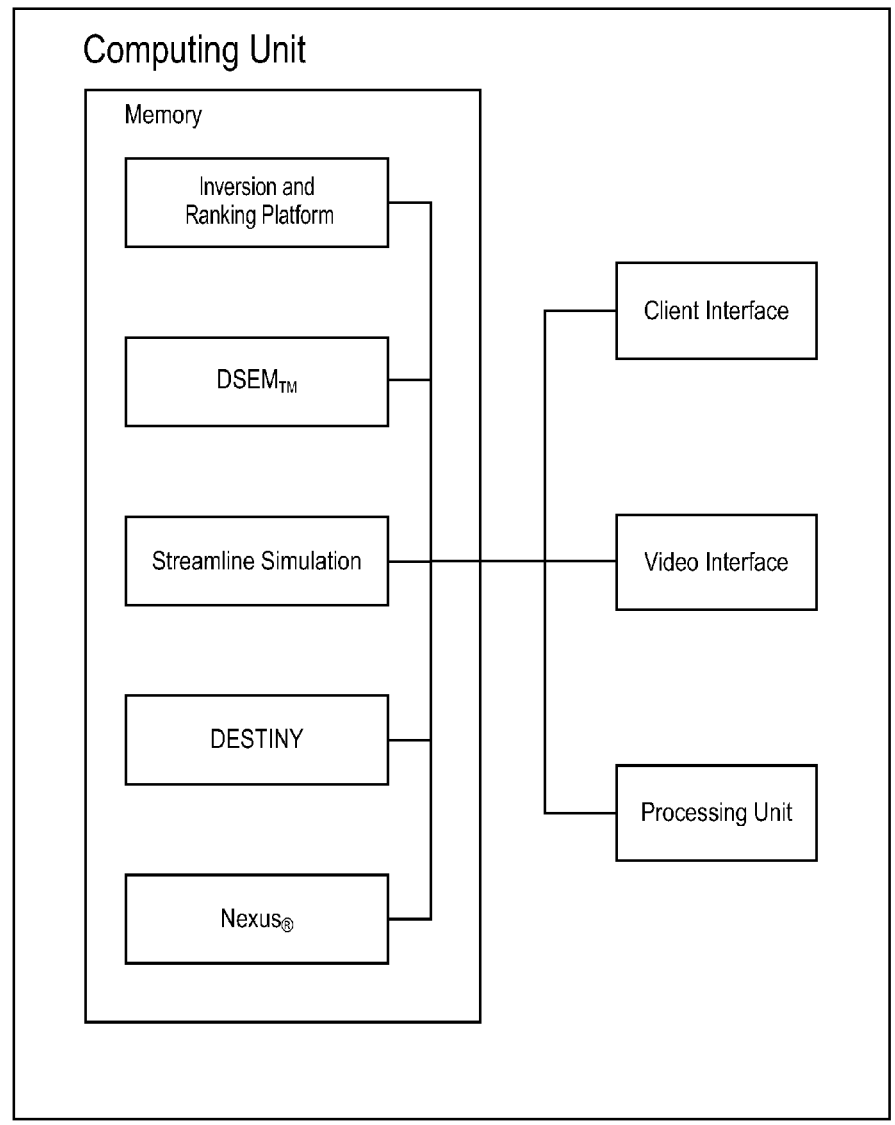
FIG. 7 is a block diagram illustrating one embodiment of a system for implementing the present invention.

In step 101, parameters for a prior geological model are input for the method 100 using the client interface and/or the video interface described in reference to FIG. 7. Such parameters may include, for example, permeability, which may be entered in the form of a 3D array [Nx, Ny, Nz].

In step 102, a number (N) of new geological realizations for the prior geological model are defined using the client interface and/or the video interface described in reference to FIG. 7.

Figure 3:
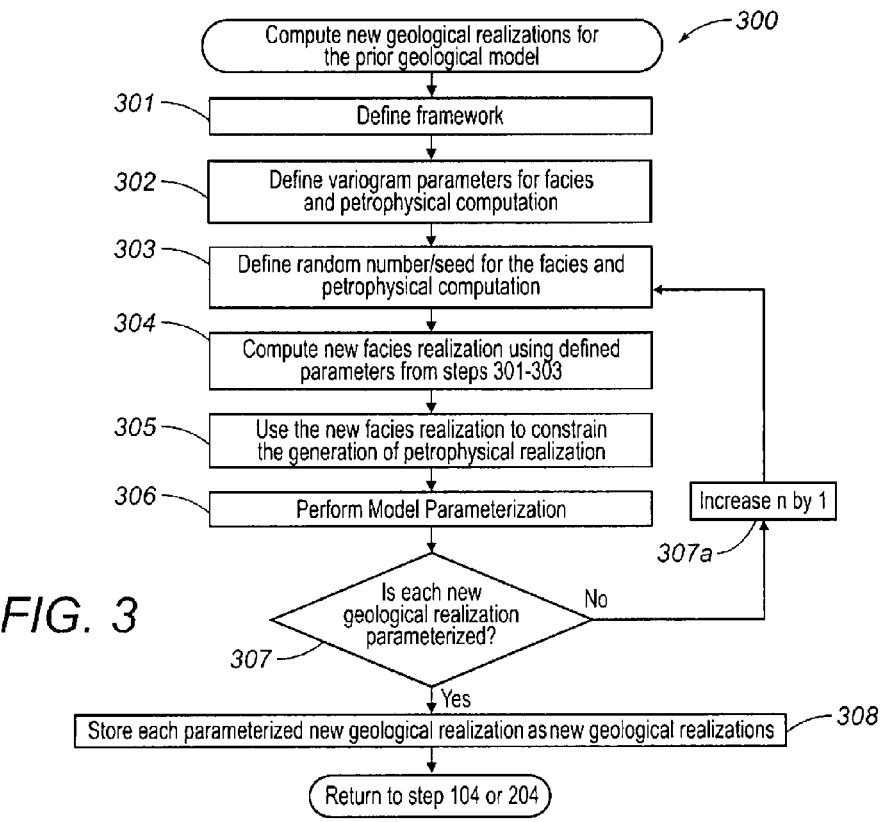
FIG. 3 is a flow diagram illustrating one embodiment of a method for implementing steps 103 and 203 in FIGS. 1 and 2, respectively.

In step 103, the number (N) of new geological realizations are computed for the prior geological model in the manner further described in reference to FIG. 3.

In step 104, an exact likelihood of an objective function is computed using the computed number (N) of new geological realizations for the prior geological model. One technique, for example, computes the exact likelihood of an objective function by performing a forward simulation, streamline-tracing and calculation of derivatives, which may be performed using techniques well known in the art and the computed number (N) of new geological realizations for the prior geological model to obtain a model response $g(m)$, a data-misfit $(d_P - g(m))$ and an array of production-data sensitivity-coefficients $S_P \in R^{[Nx*Ny*Nz]*P}$, where $d_P = d(p)$ is a vector of observed data and p=number of production wells. Another technique, for example, may be used to compute the exact likelihood of an objective function by performing a forward simulation, streamline-tracing and calculation of derivatives, which may be performed using techniques well known in the art and the computed number (N) of new geological realizations for the prior geological model to obtain a model response $g(m)$, a data-misfit $(d_P - g(m))$ and an array of sensitivity coefficients $S_P \in R^{[Nx*Ny*Nz]*P}$, where $d_P = d(p)$ is a vector of observed production data with p=number of production wells and an array of sensitivity coefficients $S_S \in R^{[Nx*Ny*Nz]*S}$, where $d_S = d(s)$ is a vector of observed (time-lapse) seismic data with s=number of (time-lapse) seismic data control points. Seismic data used in the form of fluid saturation and pressure maps may be derived by, for example, seismic inversion. These maps provide a separate set of constraints in addition to the production data. The extended term of the exact likelihood of an objective function, by combining sensitivity derivatives with respect to production data P and (time-lapse) seismic data S, has the following Bayesian formulation:

$$p_{m|d}(m|d) \propto \exp[-O(m)]$$

where $O(m) = \frac{1}{2}(d_P - g(m))^T C_P^{-1}(d_P - g(m)) + \frac{1}{2}(d_S - g(m))^T C_S^{-1}(d_S - g(m))$ and $C_P$ and $C_S$ are covariance matrices corresponding to production data P and (time-lapse) seismic data S, respectively.

In step 105, an initial state of sequential Monte Carlo ("MC") chain is defined. One proposed definition for the initial state of the sequential MC chain, for example, is: $m^i; i=1:I$, where I equals the number of sequential MC chain repetitions.

In step 106, a new sample is defined by sampling the conditional probability density function (pdf) $q (m^*|m^i)$ using a random walk sampler $m^{i+1} = m^i + \sigma\epsilon$, where $\sigma$ is a chain step size and s is a random sample from the prior geological model. Alternatively, other well known samplers may be used such as, for example, an independent sampler or a Langevin sampler.

In step 107, an approximate likelihood of objective function is computed using the new sample defined in step 106. One technique, for example, computes the approximate likelihood of objective function by proposing a transition $\delta m = m^* - m^i$, which defines change in a forward model response using the production-data sensitivity-matrix Sp; $\delta d_P = S_P \cdot \delta m$. Another technique, for example, may be used to compute the approximate likelihood of objective function by proposing a transition $\delta m = m^* - m^i$, which defines change in a forward model response using the production-data sensitivity-matrix Sp; $\delta d_P = S_P \cdot \delta m$ and the seismic data sensitivity matrix $S_S$; $\delta d_S = S_S \cdot \delta m$.

In step 108, the method 100 determines whether acceptance criteria $\alpha_1(m^*, m^i)$ are met. If the acceptance criteria are met, then the method 100 proceeds to step 110. If the acceptance criteria are not met, then the method 100 proceeds to step 108a. The acceptance criteria $\alpha_1(m^*, m^i)$ may be defined, for example, using a Metropolis-Hastings criterion, which is well known in the art. A value is sampled from a standard uniform distribution of pseudo-random numbers on the open interval $U(0,1)$ and the acceptance criteria $\alpha_1(m^*, m^i)$ is compared to the sampled value. If the acceptance criteria $\alpha_1(m^*, m^i)$ is larger than the sampled value, then the new sample $(m^i)$ is promoted to the proposed state of the sequential MC chain (i.e. $m^{i+1} = m^*$) and the method 100 proceeds to step 110. If the acceptance criteria $\alpha_1(m^*, m^i)$ is smaller than the sampled value, then the method 100 ultimately returns to step 106 where another new sample is defined.

In step 108a, another random sample is chosen from the prior geological model and the method 100 returns to step 106 to define another new sample. The method 100 therefore, iteratively proceeds through steps 106, 107, 108 and 108a until the acceptance criteria in step 108 are met.

In step 110, an exact likelihood of objective function is computed using the last new sample defined in step 106 after the acceptance criteria in step 108 are met. One technique, for example, computes the exact likelihood of an objective function by performing a forward simulation, streamline-tracing and calculation of derivatives, which may be performed using techniques well known in the art and the last new sample defined in step 106 to obtain a model response $g(m^*)$, a data-misfit $(d_P - g(m^*))$ and an array of production-data sensitivity-coefficients $S_P \in R^{[Nx*Ny*Nz]*P}$, where $d_P = d(p)$ is a vector of observed data and p=number of production wells. Another technique, for example, may be used to compute the exact likelihood of an objective function by performing a forward simulation, streamline-tracing and calculation of derivatives, which may be performed using techniques well known in the art and the last new sample defined in step 106 to obtain a model response $g(m^*)$, a data-misfit $(d_P - g(m^*))$ and an array of sensitivity coefficients $S_P \in R^{[Nx*Ny*Nz]*P}$, where $d_P = d(p)$ is a vector of observed production data with p=number of production wells and an array of sensitivity coefficients $S_S \in R^{[Nx*Ny*Nz]*S}$, where $d_S = d(s)$ is a vector of observed (time-lapse) seismic data with s=number of (time-lapse) seismic data control points. Seismic data used in the form of fluid saturation and pressure maps may be derived by, for example, seismic inversion. These maps provide a separate set of constraints in addition to the production data. The extended term of the exact likelihood of an objective function, by combining sensitivity derivatives with respect to production data P and (time-lapse) seismic data S, has the following Bayesian formulation:

$$p_{m|d}(m|d) \propto \exp[-O(m)]$$

where $O(m) = \frac{1}{2}(d_P - g(m))^T C_P^{-1}(d_P - g(m)) + \frac{1}{2}(d_S - g(m))^T C_S^{-1}(d_S - g(m))$
and $C_P$ and $C_S$ are covariance matrices corresponding to production data P and (time-lapse) seismic data S, respectively.

In step 111, the method 100 determines whether the acceptance criteria $\alpha_2(m^*, m^i)$ are met. If the acceptance criteria are met, then the method 100 proceeds to step 113. If the acceptance criteria are not met, then the method 100 proceeds to step 111a. The acceptance criteria $\alpha_2(m^*, m^i)$ may be defined, for example, using the Metropolis-Hastings criterion, which is well known in the art. A value is sampled from a standard uniform distribution of pseudo-random numbers on the open interval U(0,1) and the acceptance criteria $\alpha_2(m^*, m^i)$ is compared to the sampled value. If the acceptance criteria $\alpha_2(m^*, m^i)$ is larger than the sampled value, then the new sample ($m^i$) is accepted as the updated posterior sample (i.e. $m^{i+1} = m^*$) and the method 100 proceeds to step 113. If the acceptance criteria $\alpha_2(m^*, m^i)$ is smaller than the sampled value, then the method 100 ultimately returns to step 106 where another new sample is defined.

In step 111a, another random sample is chosen from the prior geological model and the method 100 returns to step 106 to define another new sample. The method 100 therefore, iteratively proceeds through steps 106, 107, 108, 110, 111 and 111a until the acceptance criteria in step 111 are met.

In step 113, the method 100 determines whether convergence criteria are met. If the convergence criteria are met, then the method 100 proceeds to step 114. If the convergence criteria are not met, then the method 100 proceeds to step 113a. One convergence criterion, for example, utilizes the use of a maximum entropy criterion or method. For example, the entropy S may be defined as $S = -\langle p_{m|d}(m|d) \log(p_{m|d}(m|d)) \rangle$, where $p_{m|d}(m|d)$ is the updated posterior geological model.

In step 113a, another random sample is chosen from the prior geological model and the method 100 returns to step 106 to define another new sample. The method 100 therefore, iteratively proceeds through steps 106, 107, 108, 110, 111, 113 and 113a until the convergence criteria in step 113 are met.

Figure 5:
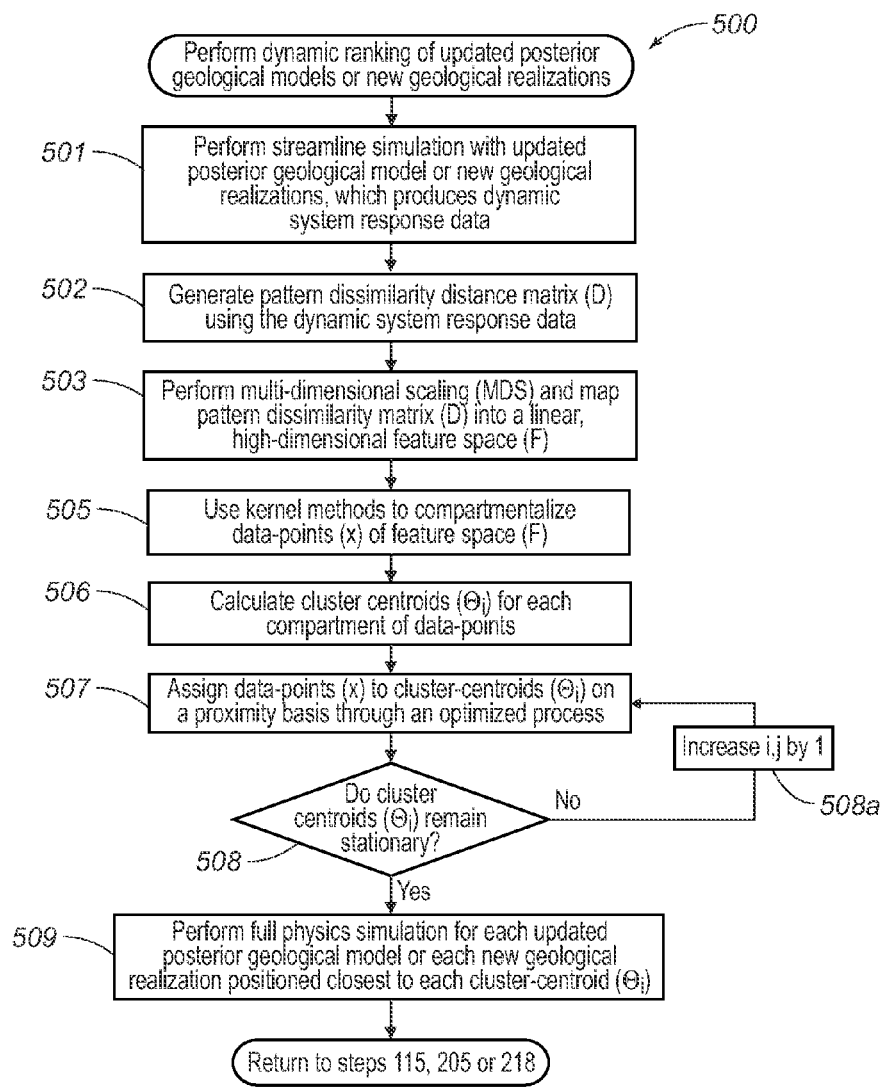
FIG. 5 is a flow diagram illustrating one embodiment of a method for implementing steps 114 and 204, 217 in FIGS. 1 and 2, respectively.

In step 114, each sample that meets the acceptance criteria in steps 108, 111 and the convergence criteria in step 113 is stored as an updated posterior geological model and is dynamically ranked in the manner further described in reference to FIG. 5.

In step 115, the ranked posterior geological models are evaluated using the client interface and/or video interface described in reference to FIG. 7, which enable the execution of one or more business decisions based on the evaluation. An evaluation may be based, for example, on the selection of a number of ranked posterior geological models. The selection may be based on a certain number of hierarchically ranked posterior geological models with respect to their corresponding Ultimate Recovery Factor (URF) and forwarded to operating units for further consideration in closed-loop reservoir management workflows or execution of well-placement optimization campaigns, for example.

Figure 2:
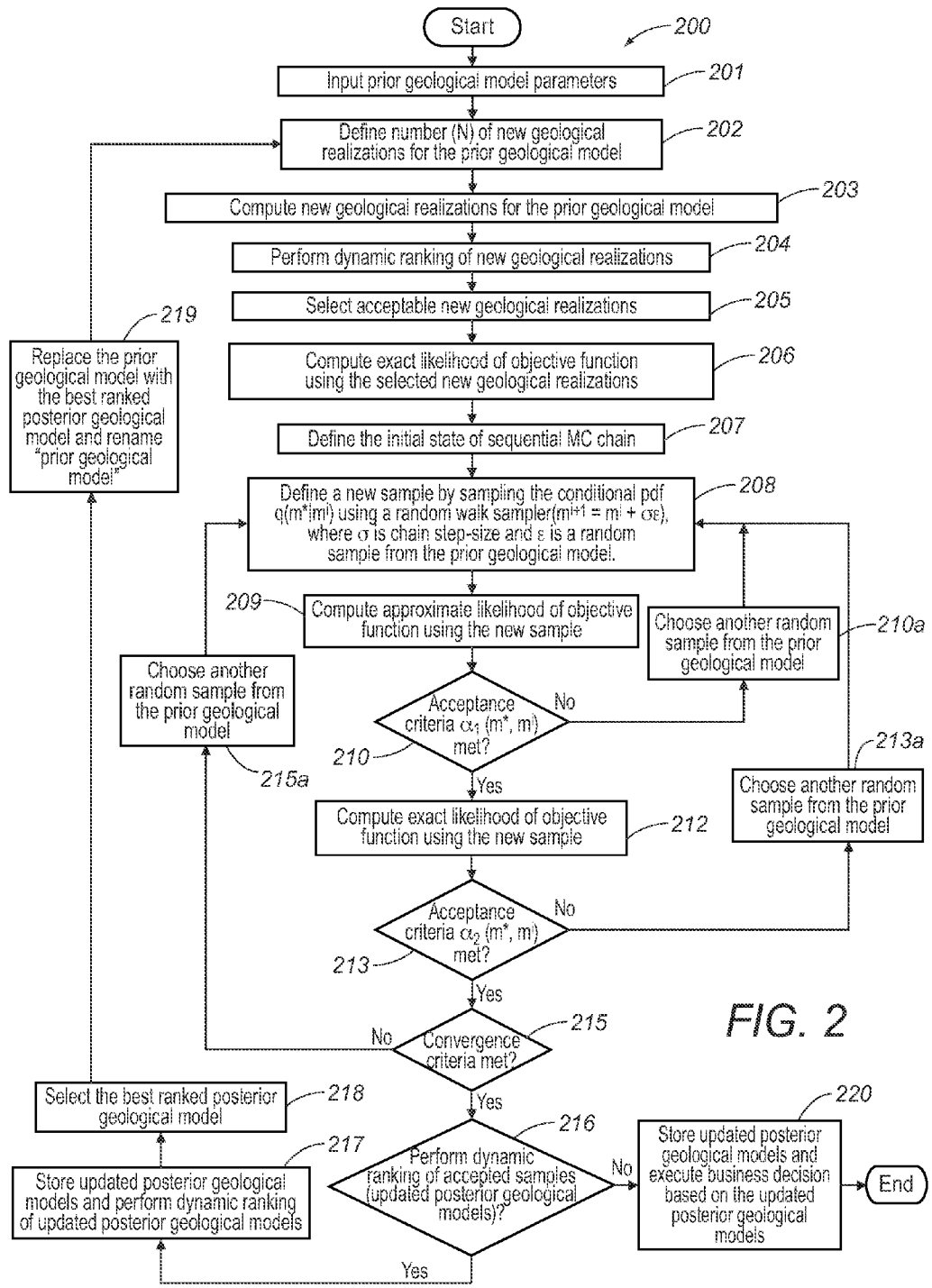
FIG. 2 is a flow diagram illustrating another embodiment of a method for implementing the present invention.

Referring now to FIG. 2, a flow diagram illustrates another embodiment of a method 200 for implementing the present invention.

In step 201, parameters for a prior geological model are input for the method 200 using the client interface and/or the video interface described in reference to FIG. 7. Such parameters may include, for example, permeability, which may be entered in the form of a 3D array [Nx, Ny, Nz].

In step 202, a number (N) of new geological realizations for the prior geological model are defined using the client interface and/or the video interface described in reference to FIG. 7.

In step 203, the number (N) of new geological realizations are computed for the prior geological model in the manner further described in reference to FIG. 3.

In step 204, the new geological realizations computed in step 203 are dynamically ranked in the manner further described in reference to FIG. 5.

In step 205, acceptable new geological realizations are selected using the client interface and/or the video interface described in reference to FIG. 7, based upon their rank. Although at least one new geological realization must be selected, preferably less than all new geological realizations are selected. Acceptable new geological realizations could, for example, be those that remain above some user-defined threshold.

In step 206, an exact likelihood of objective function is computed using the selected new geological realization(s) for the prior geological model. One technique, for example, computes the exact likelihood of an objective function by performing a forward simulation, streamline-tracing and calculation of derivatives, which may be performed using techniques well known in the art and the selected new geological realization(s) for the prior geological model to obtain a model response g(m), a data-misfit ($d_P - g(m)$) and an array of production-data sensitivity-coefficients $S_P \in R^{[Nx*Ny*Nz]*P}$, where $d_P = d(p)$ is a vector of observed data and p = number of production wells. Another technique, for example, may be used to compute the exact likelihood of an objective function by performing a forward simulation, streamline-tracing and calculation of derivatives, which may be performed using techniques well known in the art and the selected new geological realization(s) for the prior geological model to obtain a model response g(m), a data-misfit ($d_P - g(m)$) and an array of sensitivity coefficients $S_P \in R^{[Nx*Ny*Nz]*P}$, where $d_P = d(p)$ is a vector of observed production data with p = number of production wells and an array of sensitivity coefficients $S_S \in R^{[Nx*Ny*Nz]*S}$, where $d_S = d(s)$ is a vector of observed (time-lapse) seismic data with s = number of (time-lapse) seismic data control points. Seismic data used in the form of fluid saturation and pressure maps may be derived by, for example, seismic inversion. These maps provide a separate set of constraints in addition to the production data. The extended term of the exact likelihood of an objective function, by combining sensitivity derivatives with respect to production data P and (time-lapse) seismic data S, has the following Bayesian formulation:

$$p_{m|d}(m|d) \propto \exp[-O(m)]$$

where $O(m) = \frac{1}{2}(d_P - g(m))^T C_P^{-1}(d_P - g(m)) + \frac{1}{2}(d_S - g(m))^T C_S^{-1}(d_S - g(m))$
and $C_P$ and $C_S$ are covariance matrices corresponding to production data P and (time-lapse) seismic data S, respectively.

In step 207, an initial state of sequential Monte Carlo ("MC") chain is defined. One proposed definition for the initial state of the sequential MC chain, for example, is: $m^i; i = 1:I$, where 1 equals the number of sequential MC chain repetitions.

In step 208, a new sample is defined by sampling the conditional probability density function (pdf) q ($m^*|m^i$) using a random walk sampler $m^{i+1} = m^i + \sigma\epsilon$, where $\sigma$ is a chain step size and $\epsilon$ is a random sample from the prior geological model. Alternatively, other well known samplers may be used such as, for example, an independent sampler or a Langevin sampler.

In step 209, an approximate likelihood of objective function is computed using the new sample defined in step 206. One technique, for example, computes the approximate likelihood of objective function by proposing a transition $\delta m=m^*-m^i$, which defines change in a forward model response using the production-data sensitivity-matrix $S_P$; $\delta d_P=S_P\cdot\delta m$. Another technique, for example, may be used to compute the approximate likelihood of objective function by proposing a transition $\delta m=m^*-m^i$, which defines change in a forward model response using the production-data sensitivity-matrix $S_P$; $\delta d_P=S_P\cdot\delta m$ and the seismic data sensitivity matrix $S_S$; $\delta d_S=S_S\cdot\delta m$.

In step 210, the method 200 determines whether acceptance criteria $\alpha_1(m^*,m^i)$ are met. If the acceptance criteria are met, then the method 200 proceeds to step 212. If the acceptance criteria are not met, then the method 200 proceeds to step 210a. The acceptance criteria $\alpha_1(m^*,m^i)$ may be defined using a Metropolis-Hastings criterion, which is well known in the art. A value is sampled from a standard uniform distribution of pseudo-random numbers on the open interval U(0,1) and the acceptance criteria $\alpha_1(m^*,m^i)$ is compared to the sampled value. If the acceptance criteria $\alpha_1(m^*,m^i)$ is larger than the sampled value, then the new sample $(m^i)$ is promoted to the proposed state of the sequential MC chain (i.e. $m^{i+1}=m^*$) and the method 200 proceeds to step 212. If the acceptance criteria $\alpha_1(m^*,m^i)$ is smaller than the sampled value, then the method 200 ultimately returns to step 208 where another new sample is defined.

In step 210a, another random sample is chosen from the prior geological model and the method 200 returns to step 208 to define another new sample. The method 200 therefore, iteratively proceeds through steps 208, 209, 210 and 210a until the acceptance criteria in step 210 are met.

In step 212, an exact likelihood of objective function is computed using the last new sample defined in step 208 after the acceptance criteria in step 210 are met. One technique, for example, computes the exact likelihood of an objective function by performing a forward simulation, streamline-tracing and calculation of derivatives, which may be performed using techniques well known in the art and the last new sample defined in step 208 to obtain a model response $g(m^*)$, a data-misfit $(d_P-g(m^*))$ and an array of production-data sensitivity-coefficients $S_P \in R^{[Nx^*Ny^*Nz]^*P}$, where $d_P=d(p)$ is a vector of observed data and p=number of production wells. Another technique, for example, may be used to compute the exact likelihood of an objective function by performing a forward simulation, streamline-tracing and calculation of derivatives, which may be performed using techniques well known in the art and the last new sample defined in step 208 to obtain a model response $g(m^*)$, a data-misfit $(d-g(m^*))$ and an array of sensitivity coefficients $S_P \in R^{[Nx^*Ny^*Nz]^*P}$, where $d_P=d(p)$ is a vector of observed production data with p=number of production wells and an array of sensitivity coefficients $S_S \in R^{[Nx^*Ny^*Nz]^*S}$, where $d_S=d(s)$ is a vector of observed (time-lapse) seismic data with s=number of (time-lapse) seismic data control points. Seismic data used in the form of fluid saturation and pressure maps may be derived by, for example, seismic inversion. These maps provide a separate set of constraints in addition to the production data. The extended term of the exact likelihood of an objective function, by combining sensitivity derivatives with respect to production data P and (time-lapse) seismic data S, has the following Bayesian formulation:

$$p_{m|d}(m|d) \propto \exp[-O(m)]$$

where $O(m)=\frac{1}{2}(d_P-g(m))^T C_P^{-1}(d_P-g(m))+\frac{1}{2}(d_S-g(m))^T C_S^{-1}(d_S-g(m))$ and $C_P$ and $C_S$ are covariance matrices corresponding to production data P and (time-lapse) seismic data S, respectively.

In step 213, the method 200 determines whether the acceptance criteria $\alpha_2(m^*,m^i)$ are met. If the acceptance criteria are met, then the method 200 proceeds to step 215. If the acceptance criteria are not met, then the method 200 proceeds to step 213a. The acceptance criteria $\alpha_2(m^*,m^i)$ may be defined using a Metropolis-Hastings criterion, which is well known in the art. A value is sampled from a standard uniform distribution of pseudo-random numbers on the open interval U(0,1) and the acceptance criteria $\alpha_2(m^*,m^i)$ is compared to the sampled value. If the acceptance criteria $\alpha_2(m^*,m^i)$ is larger than the sampled value, then the new sample $(m^i)$ is accepted as the updated posterior sample (i.e. $m^{i+1}=m^*$) and the method 200 proceeds to step 215. If the acceptance criteria $\alpha_2(m^*,m^i)$ is smaller than the sampled value, then the method 200 ultimately returns to step 208 where another new sample is defined.

In step 213a, another random sample is chosen from the prior geological model and the method 200 returns to step 208 to define another new sample. The method 200 therefore, iteratively proceeds through steps 208, 209, 210, 212, 213 and 213a until the acceptance criteria in step 213 are met.

In step 215, the method 200 determines whether convergence criteria are met. If the convergence criteria are met, then the method 200 proceeds to step 216. If the convergence criteria are not met, then the method 200 proceeds to step 215a. One convergence criterion, for example, utilizes the use of a maximum entropy criterion or method. For example, the entropy S may be defined as $S=-\langle p_{m|d}(m|d)\log(p_{m|d}(m|d))\rangle$, where $p_{m|d}(m|d)$ is the updated posterior geological model.

In step 215a, another random sample is chosen from the prior geological model and the method 200 returns to step 208 to define another new sample. The method 200 therefore, iteratively proceeds through steps 208, 209, 210, 212, 213, 215 and 215a until the convergence criteria in step 215 are met In step 216, the method 200 determines whether to perform dynamic ranking of the accepted samples (updated posterior geological models). If dynamic ranking of the updated posterior geological models should be performed, then the method 200 proceeds to step 217. If dynamic ranking of the updated posterior geological models should not be performed, then the method 200 proceeds to step 220. The decision to perform dynamic ranking may be based on subjective criteria such as, for example, the number of updated posterior geological models using the client interface and/or the video interface described in reference to FIG. 7.

In step 217, each sample that meets the acceptance criteria in steps 210, 213 and the convergence criteria in step 215 is stored as an updated posterior geological model and is dynamically ranked in the manner further described in reference to FIG. 5.

In step 218, the best ranked posterior geological model is selected using the client interface and/or the video interface described in reference to FIG. 7. Preferably, the highest ranked posterior geological model is the best.

In step 219, the prior geological model is replaced with the best ranked posterior geological model and is renamed the "prior geological model." The method 200 then returns to step 202 to define another number (N) of new geological realizations for the prior geological model.

In step 220, the updated posterior geological models are stored and a business decision is executed based upon the updated posterior geological models using the client interface and/or the video interface described in reference to FIG. 7. For example, when updated posterior geological models are delivered to the operating unit they can be further considered for inclusion in closed-loop-reservoir-management workflows or execution of well-placement optimization campaigns.

Referring now to FIG. 3, a flow diagram illustrates one embodiment of a method 300 for implementing steps 103 and 203 in FIGS. 1 and 2, respectively.

In step 301, a framework is defined for DSEM™ using the client interface and/or the video interface described in reference to FIG. 7. The framework may be defined, for example, by entering the parameters from step 101 in DSEM™.

In step 302, variogram parameters for a facies and petrophysical computation are defined using the client interface and/or the video interface described in reference to FIG. 7. The variogram parameters may be initially computed using the techniques and algorithms for variogram modeling and computation in DSEM™, for example. DSEM™ uses variations of a well known kriging method to compute the variogram parameters.

In step 303, a random number/seed is defined for the facies and petrophysical computation using the client interface and/or the video interface described in reference to FIG. 7. A standard well-known random-number generator, for example, may be used to enter the random number/seed in DSEM™.

In step 304, a new facies realization is computed using the parameters defined in steps 301-303. The facies realization may be computed, for example, by a Pluri Gaussian Simulation, which is a well-known technique. A single new 3D facies realization is therefore, computed in the form of a single column vector with dimensions [Nx*Ny*Nz*].

Figures 6A, 6B, 6C:
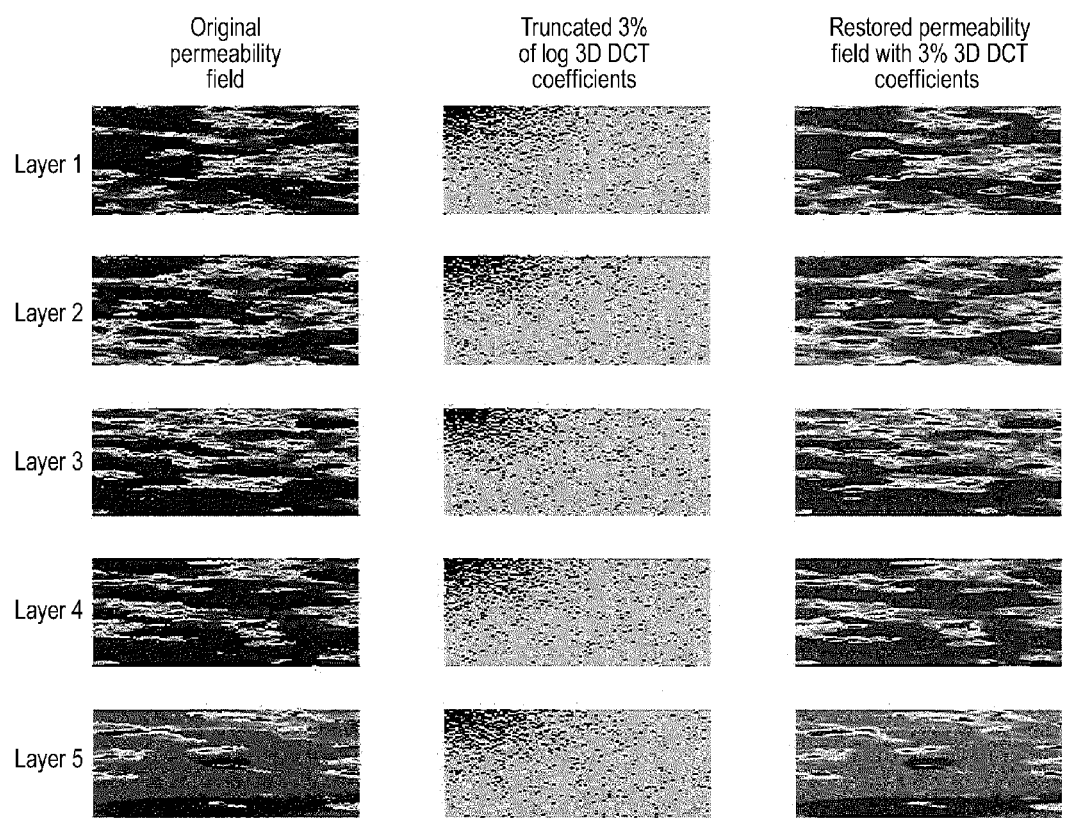
FIG. 6A is a plurality of 2D images illustrating the generation of a 3D petrophysical realization in step 305 of FIG. 3.
FIG. 6B is a plurality of 2D images illustrating the 3D results of step 404 in FIG. 4.
FIG. 6C is a plurality of 2D images illustrating the 3D results stored in step 407 of FIG. 4.

In step 305, the new facies realization is used to constrain the generation of a petrophysical realization in the form of a 3D array [Nx, Ny, Nz]. The petrophysical realization, for example, may be generated by a Turning bands simulation method, which is a well-known technique. The facies realization is therefore, used as a constraint when the petrophysical realization is generated. A single new 3D petrophysical realization is therefore, generated in the form of a single column vector with dimensions [Nx*Ny*Nz]. An exemplary generation of a 3D petrophysical realization is illustrated in FIG. 6A by a plurality of 2D images representing different layers of an original permeability field. The data used to construct the images in FIG. 6A is taken from a well known data source referred to as the Brugge synthetic data set, which is publicly available.

Figure 4:
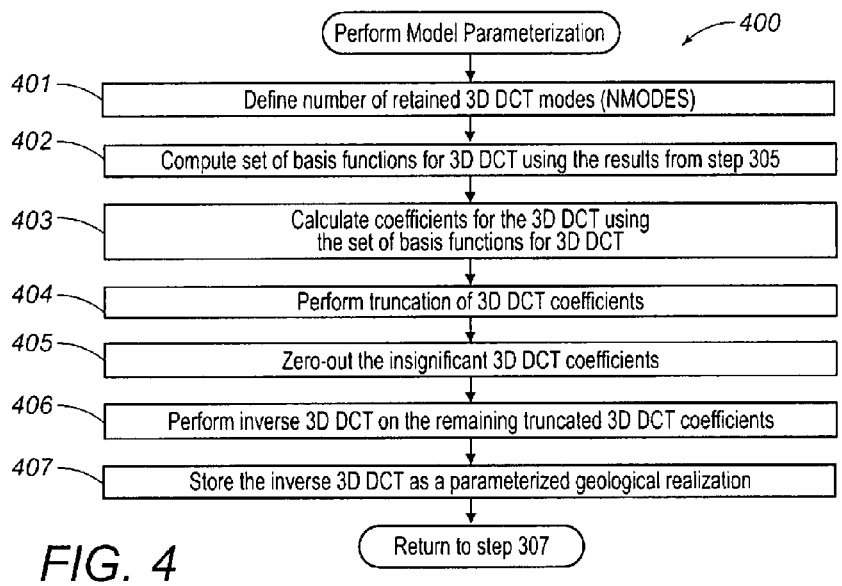
FIG. 4 is a flow diagram illustrating one embodiment of a method for implementing step 306 in FIG. 3.

In step 306, model parameterization is performed on one of the geological realizations from the number (N) of new geological realizations in the manner further described in reference to FIG. 4.

In step 307, the method 300 determines if each new geological realization is parameterized. If each new geological realization has been parameterized, then the method 300 proceeds to step 308. If each new geological realization has not been parameterized, then the method 300 proceeds to step 307a.

In step 307a, (n) is increased by one (1) until (n) is equal to the defined number (N) of new geological realizations and the method 300 returns to step 303 to define another random number/seed for simulation. The method 300 therefore, iteratively proceeds through steps 303, 304, 305, 306, 307 and 307a until each new geological realization has been parameterized according to step 306.

In step 308, each parameterized new geological realization is stored as a new geological realization and is returned to step 104 or step 204.

Referring now to FIG. 4, a flow diagram illustrates one embodiment of a method 400 for implementing step 306 in FIG. 3. The method utilizes a Discrete Cosine Transform (DCT). The DCT is currently the most successful transform for image compression and pattern recognition, and has been recognized as an efficient method for parameterization of new realizations for a permeability field using history matching and Ensemble Kalman Filter (EnKF) methods.

In step 401, the number of retained 3D DCT modes (NMODES) is defined using the client interface and/or the video interface described in reference to FIG. 7. The number of retained 3D DCT modes (NMODES) may be based on a subjective determination of what is best.

In step 402, a set of basis functions ($\alpha(u)$, $\alpha(v)$, $\alpha(w)$) is computed for a 3D DCT using the petrophysical realization generated in step 305 by:

$$\alpha(u) = \begin{cases} \sqrt{\dfrac{1}{N_x}} & \text{for } u = 0 \\ \sqrt{\dfrac{2}{N_x}} & \text{for } u \neq 0 \end{cases} \quad \alpha(v) = \begin{cases} \sqrt{\dfrac{1}{N_y}} & \text{for } v = 0 \\ \sqrt{\dfrac{2}{N_y}} & \text{for } v \neq 0 \end{cases}$$

$$\alpha(w) = \begin{cases} \sqrt{\dfrac{1}{N_z}} & \text{for } w = 0 \\ \sqrt{\dfrac{2}{N_z}} & \text{for } w \neq 0 \end{cases}$$

Nx, Ny and Nz therefore, correspond to the petrophysical realization represented as 3D array in step 305.

In step 403, coefficients (C(u,v,w)) for the 3D DCT are calculated using the set of basis functions ($\alpha(u)$, $\alpha(v)$, $\alpha(w)$) for the 3D DCT by:

$$C(u, v, w)) = \left( \alpha(u)\alpha(v)\alpha(w) \sum_{x=0}^{N_x-1} \sum_{y=0}^{N_y-1} \sum_{z=0}^{N_z-1} f(x, y, z) \cos\left(\frac{\pi(2x+1)u}{2*Nx}\right) \cos\left(\frac{\pi(2y+1)v}{2*Ny}\right) \cos\left(\frac{\pi(2z+1)w}{2*Nz}\right) \right)$$

In step 404, truncation of the 3D DCT coefficients is performed by finding a threshold to retain NMODES of significant coefficients for the 3D DCT. Finding the threshold to retain NMODES of significant coefficients may be performed in two steps: i) sorting an array of absolute 3D DCT coefficients in ascending order; and ii) calculating the threshold by rounding the elements of (Nx*Ny*Nz−NMODES) down to the nearest integer. An exemplary truncation of the 3D DCT coefficients is illustrated in FIG. 6B by a plurality of 2D images representing different layers of truncated 3% of log 3D DCT coefficients. The data used to construct the images in FIG. 6B is taken from the same data source used to construct the images in FIG. 6A.

In step 405, the insignificant 3D DCT coefficients are nullified using techniques well known in the art to zero-out the insignificant 3D DCT coefficients. The insignificant 3D DCT coefficients may be nullified, for example, by: i) retaining the NMODES of significant coefficients from step 404 and ii) mapping the 3D DCT coefficients calculated in step 403 onto the NMODES of significant coefficients.

In step 406, an inverse 3D DCT is performed on the remaining truncated 3D DCT coefficients by:

$$f(x, y, z) = \sum_{u=0}^{Nx-1} \sum_{v=0}^{Ny-1} \sum_{w=0}^{Nz-1} \alpha(u)\alpha(v)\alpha(w)C(u, v, w)$$

$$\cos\left(\frac{\pi(2x+1)u}{2*Nx}\right)\cos\left(\frac{\pi(2y+1)v}{2*Ny}\right)\cos\left(\frac{\pi(2z+1)w}{2*Nz}\right)$$

In step 407, the inverse 3D DCT is stored as a parameterized geological realization and is returned to step 307 in FIG. 3. An exemplary inverse 3D DCT as a result of step 406 is illustrated in FIG. 6C by a plurality of 2D images representing different layers of a restored permeability field with 3% 3D DCT coefficients. The data used to construct the images in FIG. 6C is taken from the same data source used to construct the images in FIGS. 6A and 6B. As revealed by a comparison of FIG. 6A and FIG. 6C, each image for the same layer in FIG. 6A and FIG. 6C appears almost identical. The fact that FIG. 6A and FIG. 6C appear almost identical highlights the accuracy and efficiency of the 3D DCT model parameterization method 400. It also demonstrates that the original permeability field in FIG. 6A can be restored using only the 3% 3D DCT coefficients retained as a result of the method 400.

Referring now to FIG. 5, a flow diagram illustrates one embodiment of a method 500 for implementing steps 114 and 204, 217 in FIGS. 1 and 2, respectively.

In step 501, a streamline simulation is performed with the updated posterior geological models (steps 114, 217) or the new geological realizations (step 204) using techniques well known in the art, which produces a dynamic system response such as, for example, a recovery factor. The streamline simulation is performed using techniques well known in the art.

In step 502, a pattern dissimilarity distance matrix (D) is generated using the dynamic system response data calculated in step 501. In one embodiment, for example, the pattern dissimilarity distance matrix is generated by:
(D)=$\{\delta_{ij}\}$ of dynamic response in Euclidean space E, where $$\delta_{ij} = \sqrt{\sum_{i,j=1}^{n} (RF_i - RF_j)^2}$$

and i,j=1, . . . , N

In step 503, a multi-dimensional scaling (MDS) is performed and the pattern dissimilarity distance matrix (D) is mapped into a linear, high-dimensional feature space (F) using well-known techniques such as, for example, Kernel Principal Component Analysis or K-means clustering.

In step 505, kernel methods, which are techniques well know in the art, are used to compartmentalize data points (x) of feature space (F). In one embodiment, for example, the data points (x) of feature space (F) are compartmentalized by i) defining a-priori number of clusters (k); ii) partitioning $N_c$ data points (x) randomly into clusters (k); and iii) calculating cluster centroids ($\Theta_i$).

In step 506, cluster centroids ($\Theta_i$) are calculated for each compartment of data points (x) using techniques which are well known in the art.

In step 507, data points (x) are assigned to cluster centroids ($\Theta_i$) on a proximity basis through an optimized process. In one embodiment, for example, the optimized process may minimize the "square distance" objective function O(x,$\Theta_i$), where:

$$O = \sum_{i=1}^{k} \sum_{j=1}^{Nc} |x_j - \Theta_i|^2$$

In step 508, the method 500 determines whether the cluster centroids ($\Theta_i$) remain stationary. If the cluster centroids ($\Theta_i$) remain stationary, then the method 500 proceeds to step 509. If the cluster centroids ($\Theta_i$) do not remain stationary, then the method 500 proceeds to step 508a.

In step 508a, i, j are increased by 1 for the optimized process in step 507 and the method 500 returns to step 507. The method 500 therefore, iteratively proceeds through steps 507, 508 and 508a until the cluster centroids ($\Theta_i$) remain stationary.

In step 509, a full-physics simulation is performed for each updated posterior geological model or each new geological realization positioned closest to each cluster centroid ($\Theta_i$) using techniques well known in the art such as, for example, a finite-difference forward-reservoir simulator. In this manner, the updated posterior geological models or the new geological realizations are dynamically ranked according to the results of the full-physics simulation and the results are returned to step 115, step 205 or step 218.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace Earth Modeling (DSEM™) and Nexus®, which are commercial software applications marketed by Landmark Graphics Corporation, may be used with other third party applications (e.g. Streamline Simulation and DESTINY) as interface applications to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 7, a block diagram of a system for implementing the present invention on a computer is illustrated. The system includes a computing unit, sometimes referred to as a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-5. The memory therefore, includes an inversion and ranking platform, which enables the methods illustrated and described in reference in FIGS. 1 and 2 and integrates functionality from the remaining application programs illustrated in FIG. 7. The inversion and ranking platform, for example, integrates DSEM™ to execute the functions described in reference to steps 103 and 203 in FIGS. 1 and 2, respectively. In particular, DSEM™ may be used to execute the functions described in reference to steps 301-305 in FIG. 3 while the inversion and ranking platform is used to execute the functions described in reference to steps 306-308 in FIG. 3 and steps 401-407 in FIG. 4. The inversion and ranking platform, for example, also integrates a third party streamline simulation application program, (e.g. 3DSL offered by StreamSim Technologies, Inc.) to execute the functions described in reference to step 501 in FIG. 5 while the inversion and ranking platform is used to execute the functions described in reference to steps 502-508 in FIG. 5. The inversion and ranking platform, for example, also integrates DESTINY, which is an application program developed within a joint industry project led by Texas A&M University, and Nexus® to execute the functions described in reference to steps 104, 110 in FIG. 1 and steps 206, 212 in FIG. 2. And, Nexus® may also be used to execute the functions described in reference to step 509 in FIG. 5.

Although the computing unit is shown as having a generalized memory, the computing unit typically includes a variety of computer readable media. By way of example, and not limitation, computer readable media may comprise computer storage media. The computing system memory may include computer storage media in the form of volatile and/or non-volatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through application program interface ("API"), which may reside on a separate computing unit connected through a computer system or network. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for updating posterior geological models, comprising:
   a) computing new geological realizations for a prior geological model using a computer processor;
   b) computing an exact likelihood of an objective function using the new geological realizations for the prior geological model or an acceptable number of the new geological realizations for the prior geological model;
   c) defining an initial state for a sequential Monte Carlo chain based on the exact likelihood of an objective function;
   d) defining a new sample based on the initial state for a sequential Monte Carlo chain and a random sample from the prior geological model;
   e) computing an approximate likelihood of an objective function using the new sample;
   f) repeating step d), based only on another random sample from the prior geological model, and step e) until the approximate likelihood of an objective function meets an acceptance criteria;
   g) computing another exact likelihood of an objective function using the new sample if the new sample meets the acceptance criteria;

h) repeating step d), based only on another random sample from the prior geological model, and steps e) through g) until the another exact likelihood of an objective function meets another acceptance criteria;

i) repeating step d), based only on another random sample from the prior geological model, and steps e) through h) until a convergence criteria is met; and j) storing each new sample that meets the acceptance criteria and the another acceptance criteria, each new sample representing a respective updated posterior geological model for the prior geological model.

2. The method of claim 1, further comprising defining a number (N) of new geological realization to compute for the prior geological model.

3. The method of claim 1, wherein the new geological realizations are computed using parameters for the prior geological model.

4. The method of claim 1, further comprising dynamically ranking each updated posterior geological model.

5. The method of claim 4, further comprising:
evaluating the ranked updated posterior geological models; and
executing a business decision based on the evaluation.

6. The method of claim 1, further comprising:
dynamically ranking the new geological realizations; and
selecting the acceptable number of the new geological realizations based upon the dynamic ranking of the new geological realizations.

7. The method of claim 1, further comprising:
dynamically ranking each updated posterior geological model;
selecting a best ranked updated posterior geological model;
replacing the prior geological model with the best ranked updated posterior geological model;
renaming the best ranked updated posterior geological model as the prior geological model;
defining a number (N) of new geological realizations to compute for the prior geological model; and
repeating the steps of claim 1.

8. The method of claim 1, further comprising executing a business decision based on each updated posterior geological model.

9. The method of claim 7, wherein the best ranked updated posterior geological model represents a highest ranked updated posterior geological model.

10. The method of claim 4, wherein each updated posterior geological model is ranked by an ultimate recovery factor corresponding to each respective updated geological model.

11. A non-transitory program carrier device tangibly carrying computer executable instructions for updating posterior geological models, the instructions being executable to implement:

a) computing new geological realizations for a prior geological model;

b) computing an exact likelihood of an objective function using the new geological realizations for the prior geological model or an acceptable number of the new geological realizations for the prior geological model;

c) defining an initial state for a sequential Monte Carlo chain based on the exact likelihood of an objective function;

d) defining a new sample based on the initial state for a sequential Monte Carlo chain and a random sample from the prior geological model;

e) computing an approximate likelihood of an objective function using the new sample;

f) repeating step d), based only on another random sample from the prior geological model, and step e) until the approximate likelihood of an objective function meets an acceptance criteria;

g) computing another exact likelihood of an objective function using the new sample if the new sample meets the acceptance criteria;

h) repeating step d), based only on another random sample from the prior geological model, and steps c) through g) until the another exact likelihood of an function meets another acceptance criteria;

i) repeating step d), based only on another random sample from the prior geological model, and steps e) through h) until a convergence criteria is met; and j) storing each new sample that meets the acceptance criteria and the another acceptance criteria, each new sample representing a respective updated posterior geological model for the prior geological model.

12. The program carrier device of claim 11, further comprising defining a number (N) of new geological realizations to compute for the prior geological model.

13. The program carrier device of claim 11, wherein the new geological realizations are computed using parameters for the prior geological model.

14. The program carrier device of claim 11, further comprising dynamically ranking each updated posterior geological model.

15. The program carrier device of claim 14, further comprising:
evaluating the ranked updated posterior geological models; and
executing a business decision based on the evaluation.

16. The program carrier device of claim 11, further comprising:
dynamically ranking the new geological realizations; and
selecting the acceptable number of the new geological realizations based upon the dynamic ranking of the new geological realizations.

17. The program carrier device of claim 11, further comprising:
dynamically ranking each updated posterior geological model;
selecting a best ranked updated posterior geological model;
replacing the prior geological model with the best ranked updated posterior geological model;
renaming the best ranked updated posterior geological model as the prior geological model;
defining a number (N) of new geological realizations to compute for the prior geological model; and
repeating the steps of claim 11.

18. The program carrier device of claim 11, further comprising executing a business decision based on each updated posterior geological model.

19. The program carrier device of claim 17, wherein the best ranked updated posterior geological model represents a highest ranked updated posterior geological model.

20. The program carrier device of claim 14, wherein each updated posterior geological model is ranked by an ultimate recovery factor corresponding to each respective updated posterior geological model.

* * * * *